United States Patent
Eulenstein et al.

(10) Patent No.: US 6,378,761 B2
(45) Date of Patent: Apr. 30, 2002

(54) PROCESS FOR JOINING COMPONENTS MADE FROM CASE-HARDENED STEEL TO COMPONENTS MADE FROM CAST IRON

(75) Inventors: Tycho Eulenstein, Kassel; Markus Kern; Rudolf Paasch, both of Filderstadt; Bernd Schietinger, Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/810,529

(22) Filed: Mar. 19, 2001

(30) Foreign Application Priority Data

Mar. 17, 2000 (DE) .......................... 100 13 430

(51) Int. Cl.[7] ................................. B23K 31/02
(52) U.S. Cl. ............... 228/246; 228/262.4; 228/262.41
(58) Field of Search .................. 228/262.4, 262.41, 228/194, 245, 246, 164

(56) References Cited

U.S. PATENT DOCUMENTS

| | | | | |
|---|---|---|---|---|
| 4,306,139 A | * | 12/1981 | Shinozaki et al. | |
| 4,426,426 A | * | 1/1984 | MuleuEu | |
| 4,534,793 A | * | 8/1985 | Olson et al. | |
| 4,561,484 A | * | 12/1985 | Usui et al. | |
| 4,726,854 A | * | 2/1988 | Olson et al. | |
| 4,790,473 A | * | 12/1988 | Narasimhan et al. | |
| 4,817,859 A | * | 4/1989 | Breitenmoser et al. | |
| 4,865,896 A | * | 9/1989 | Yoshida et al. | |
| 5,422,071 A | * | 6/1995 | Kiser | |
| 5,678,753 A | * | 10/1997 | Stauder | |
| 6,308,882 B1 | * | 10/2001 | Shuster et al. | |

FOREIGN PATENT DOCUMENTS

| | | | |
|---|---|---|---|
| DE | 2 042 488 | | 3/1972 |
| EP | 13323 A | * | 7/1980 |
| EP | 0 467 881 | | 1/1992 |
| JP | 407032166 A | * | 2/1995 |
| JP | 407256445 A | * | 10/1995 |
| JP | 408290292 A | * | 11/1996 |
| JP | 11199921 A | * | 7/1999 |
| WO | WO 97/45228 | | 5/1997 |
| WO | WO 99/58287 | | 5/1999 |

OTHER PUBLICATIONS

US 2001/0030224 A1 Eulenstein et al. (Oct. 18, 2001).*

* cited by examiner

*Primary Examiner*—Tom Dunn
*Assistant Examiner*—Kiley Stoner
(74) *Attorney, Agent, or Firm*—Crowell & Moring LLP

(57) ABSTRACT

A process for joining or welding components made from case-hardened steel to one another or to components made from cast iron uses a nickel-containing filler. The components are not prepared for the welding operation, i.e., the components do not undergo at least partial abrasion of surfaces to be joined.

6 Claims, 3 Drawing Sheets

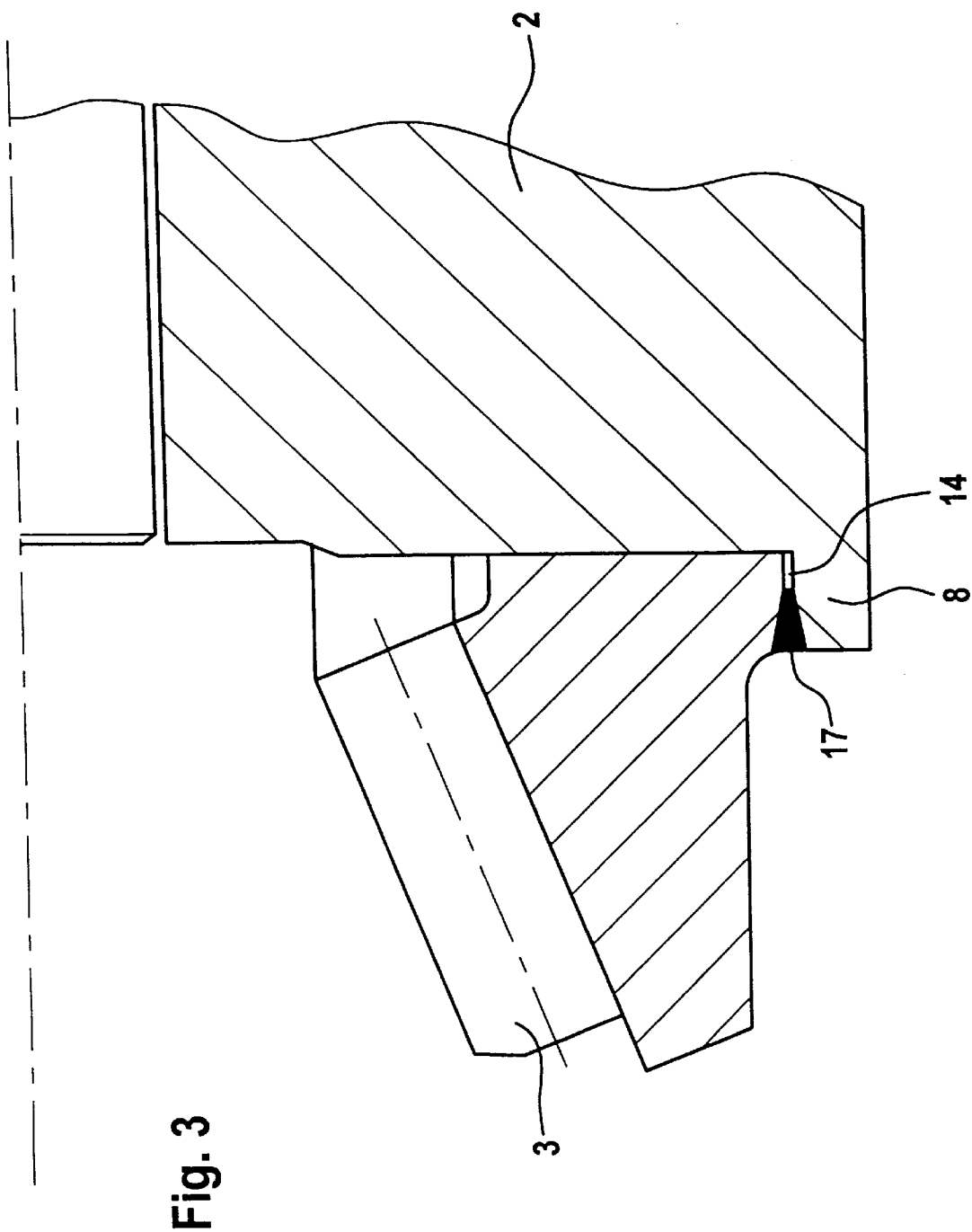

PROCESS FOR JOINING COMPONENTS MADE FROM CASE-HARDENED STEEL TO COMPONENTS MADE FROM CAST IRON

BACKGROUND AND SUMMARY OF INVENTION

This application claims the priority of German Application No. 100 13 430.0, filed Mar. 17, 2000, the disclosure of which is expressly incorporated by reference herein.

The present invention relates to a process for joining components made from case-hardened steel to one another or to components made from cast iron.

In modern production technology, it is of great interest to join components made from case-hardened steel to one another or to components made from cast iron. First, in terms of manufacturing technology it is often more expedient to initially produce two separate components and then to join them together. Second, the demands imposed on the component to be produced often cannot be fulfilled by one material.

By way of example, these problems arise in the automotive sector during the production of transmissions, e.g., in a differential gear the differential casing is produced from cast iron, on account of its geometrically complicated configuration. The ring gear connected thereto generally consists of case-hardened steel, so that at its surface it has a high strength and is wear-resistant, while having a relatively soft core material. The term case-hardened steel is understood as meaning steels which have a high surface hardness which is formed as a result of the workpiece being annealed in carbon-dominating media followed by quenching. As a result of the annealing operation, the surface layer of the workpieces is enriched with carbon and is hardened by a quenching operation from the annealing temperature.

In known differential gears, the connection between differential casing and ring gear is produced by screws. A screw connection has the drawback that a solid flange is required on the differential casing. Construction space is required for this flange and for the screw head and assembly. In addition, a minimum thread depth is required to achieve a secure connection. Therefore, the width of the ring gear must be able to accommodate the shank of the screw. Furthermore, the dimensions of the ring gear must be selected in such a way that it satisfies stability requirements, in particular because the plane of loading from the forces to be transmitted runs through the screw thread. These design boundary conditions mean that the ring gear must be of a minimum size. This minimum size, as well as the solid flange and the screw heads, have an adverse effect on the weight of the differential gear and therefore on production costs.

On account of the high carbon contents both in the cast iron and on the surface of the case-hardened steel, it is not possible to weld components of this type to one another. At the concentrations which result with these combinations of materials, the carbon in the molten material, during the rapid cooling after welding, forms brittle microstructural constituents which have an adverse effect on the quality of the weld seam and may lead to cracks forming.

Although WO 99/58287 A1 has disclosed a process in which a case-hardened ring gear is welded to a differential casing made from cast iron with spheroidal graphite. To do this, the surfaces which are to be welded on the otherwise fully machined components, prior to welding, are at least partially abraded for weld preparation, so that a narrow groove is formed where the welding is to be carried out. This machining step means that in the case-hardened ring gear the surface is removed in the region of the joint. This is the region of the component which has the highest carbon content. Since in a case-hardened steel the proportion of carbon falls very considerably at increasing distance from the surface, making the groove leads to an extreme reduction in the carbon content at the joint, with the result that the above-described problems involved in welding materials with high carbon contents are reduced considerably. In the differential gear described in WO 99/58287 A1, the welding is carried out with a welding wire being supplied continuously.

A drawback of this process is that the parts which are to be joined have to be prepared for the welding. The surfaces which are to be welded are at least partially abraded. This preparation represents an additional working step which, in the case of case-hardened steel, is associated with high machining costs, on account of the high strength.

In the known gear, the surfaces to be welded comprise two regions: a groove region and a centering region which is arranged beneath the groove region and at which the ring gear and differential casing abut against one another. After the welding, shrinkage processes cause this centering region to act as a notch on the weld seam, which affects the quality of this seam.

Furthermore, the continuous supply of welding wire during the welding operation represents a drawback, since this requires complex positioning and control of the welding wire feed rate. In the case of interference with these parameters, the filler is not uniformly distributed over the entire height and length of the weld seam. Particularly in the weld route, optimum mixing of the filler with the molten metal is not ensured.

In view of this background, the present invention is based on the object of providing a process for joining components made from case-hardened steel to one another or to components made from cast iron which is simple in terms of production technology and is inexpensive.

According to the present invention, this object is achieved by a process in which the components which are to be joined are welded together using a nickel-containing filler without being specially prepared for the welding operation (i.e. without at least part of the joining surfaces which are to be welded being abraded).

The process according to the present invention has the advantage that no weld preparation, which is highly complex in particular with case-hardened steels on account of the high strength of the surface, is required. The components can be welded together without any treatment of the joints, simply using a nickel-containing filler, for example pure nickel or X10CrNiTi 18 9. In the solidified weld seam, the nickel of the filler forms a buffer between the brittle microstructural constituents which form when the molten material solidifies and thus prevents cracks from forming in the weld seam. In this way, at least one machining step is saved, thus simplifying production and therefore making it more expedient. Particularly for series manufacture with high numbers, this advantage makes its presence felt in terms of costs.

It has proven particularly advantageous to add the filler in the form of a foil which is approximately 0.1 to 0.3 mm thick. This foil is laid between the components to be joined prior to the welding. The foil covers the entire area of the joint between the components. A complex device for supplying filler in wire form during welding is not required. Further, the filler is uniformly available over the entire height and length of the joint, leading to uniform mixing of the filler in the molten material and therefore to a reproducible quality of the seam which is constant over the height and length, in particular in the seam route.

Further, the exact position of the parts which are to be welded with respect to one another can be determined by the thickness of the foil. However, the presence of the filler which determines the quality of the welded joint can also be monitored by the position of the parts which are to be welded. In a preferred embodiment, the foil additionally serves as a spacer between the components which are to be joined, so that a gap is formed beneath the weld seam after welding, with the result that the weld seam is free of adverse effects from below (notch effects).

To achieve a high-quality weld seam, pure nickel has proven to be a particularly appropriate filler.

Other objects, advantages and novel features of the present invention will become apparent from the following detailed description of the invention when considered in conjunction with the accompanying drawings.

BRIEF DESCRIPTION OF THE DRAWINGS

FIG. 3 shows a detailed illustration, in section, of the connection point between ring gear and differential casing after welding.

DETAILED DESCRIPTION OF THE DRAWINGS

Figure 1:
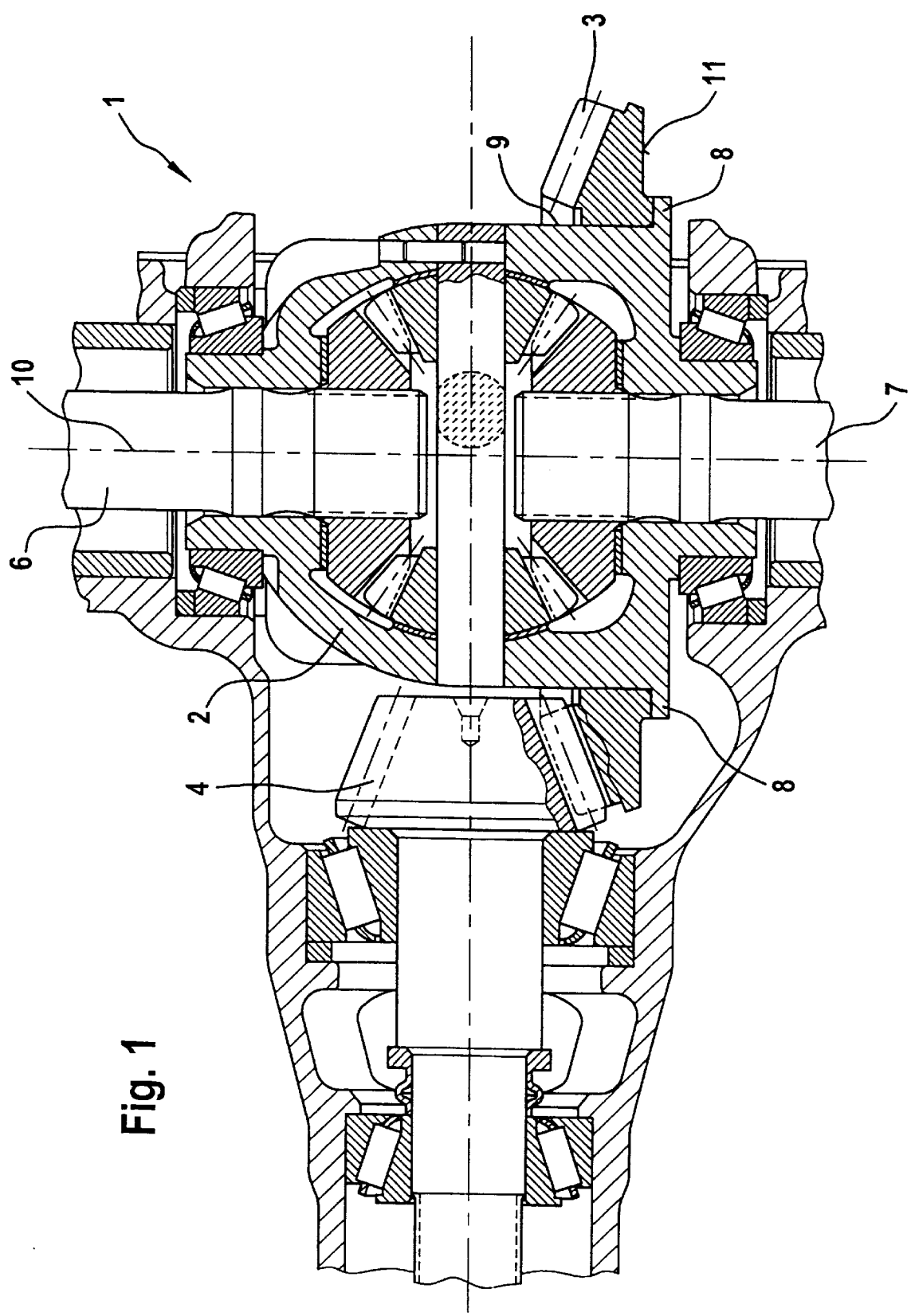
FIG. 1 shows a section through a differential gear produced using the process according to the present invention.

In accordance with FIG. 1, the differential gear 1 which has been produced using the process according to the present invention comprises a differential casing 2 made from cast iron with spheroidal graphite and a ring gear 3 made from case-hardened steel. The ring gear 3 is connected to a drive shaft via a drive bevel wheel 4. The power generated by the engine is transmitted from the drive shaft, via the differential gear 1, to two wheel axles 6 and 7, which are of identical design. In the gear 1 according to the present invention, the differential casing 2 is provided with a bearing shoulder 8. The bearing shoulder 8 is integrally formed on the periphery 9 of the differential casing 2 onto which the ring gear 3 is pressed and, with respect to the axis of symmetry 10 of the ring gear 3, extends beyond the periphery 9 of the differential casing 2 in the radial direction. It has a rectangular cross section which is dimensioned to be sufficiently narrow and short for it to be soft with respect to shrinkage of a weld seam arranged on the bearing shoulder.

Figure 2:
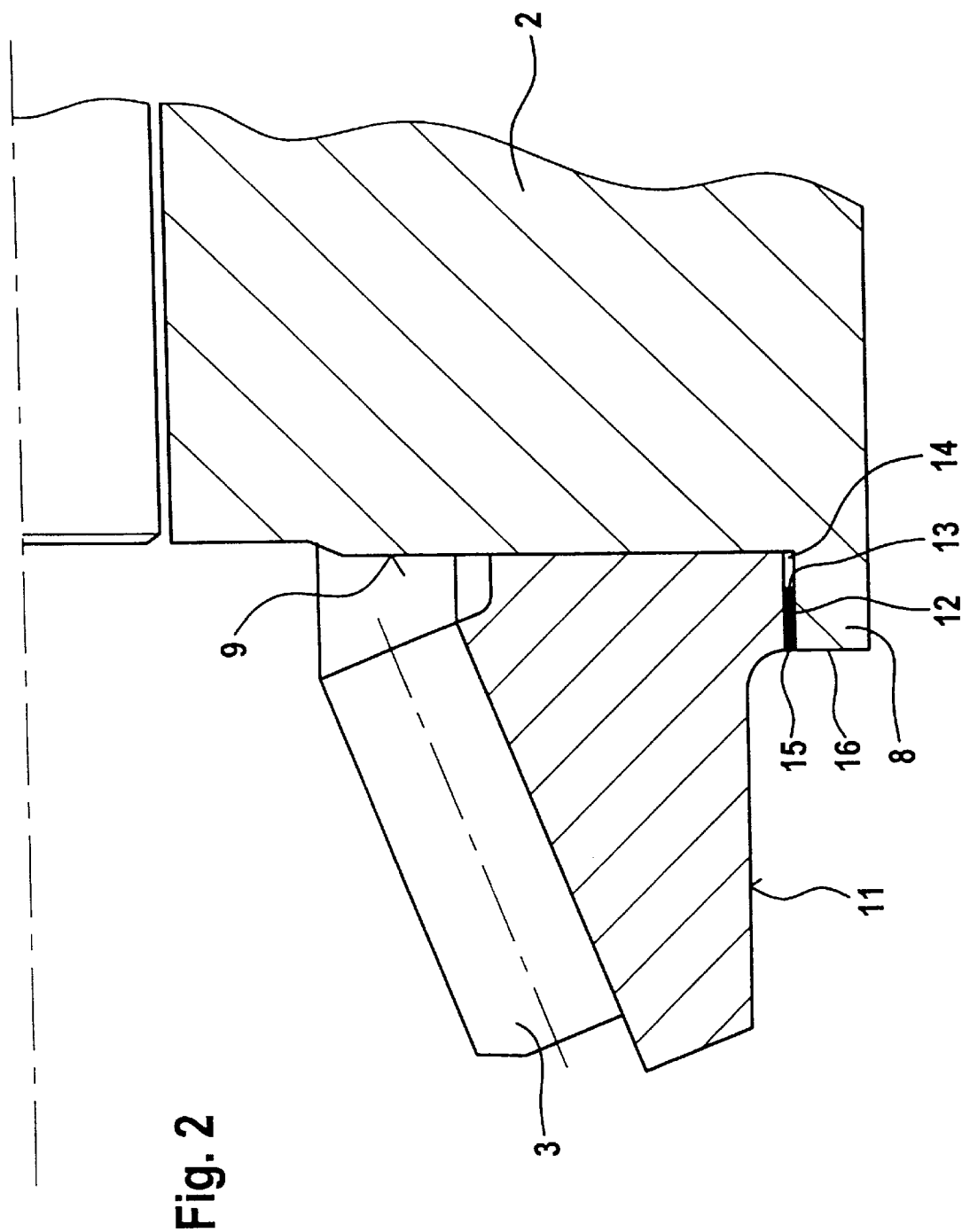
FIG. 2 shows a detailed illustration, in section, of the connection point between ring gear and differential casing prior to welding.

The ring gear 3 is pressed onto the differential casing 2 in such a way that its side 11 which is remote from the toothing faces towards the bearing shoulder 8. Before the ring gear 3 is pressed on, a nickel-containing filler, in the form of an annular foil 12, is pushed onto the differential casing 2, so that, as illustrated in FIG. 2, after it has been pressed on the ring 12 comes to lie between bearing shoulder 8 and ring gear 3. The ring 12 may serve as a means for positioning the ring gear 3 on the casing 2. The position of the ring gear 3 on the differential casing 2 can be influenced and accurately determined by the thickness of the ring 12. To achieve a high-quality weld seam, pure nickel with a thickness of 0.2 mm has proven to be a particularly advantageous filler.

The internal diameter 13 of the foil 12 is larger than the periphery 9 of the differential casing 2, so that a gap 14 is formed beneath the ring 12, between bearing shoulder 8 and ring gear 3. The external diameter 15 is exactly the same size as the periphery 16 of the bearing shoulder 8. This geometric configuration ensures that the filler is uniformly distributed over the entire height and length of the joint and is optimally mixed with the molten material in all regions during welding. The gap 14 ensures that the weld seam 16 is free of adverse effects from below.

The use of the filler makes it possible for ring gear 3 and differential casing 2 to be welded to one another despite the high carbon content and without the components having to be prepared for the welding operation. In the solidified weld seam 17, the nickel in the filler forms a buffer between the brittle microstructural constituents which are formed during cooling and therefore prevents cracks from forming in the weld seam 17.

FIG. 3 shows a section through a differential gear 2 with a ring gear 3 which have been welded together via the bearing shoulder 8. The weld seam 17 is of wedge-shaped configuration and is arranged with respect to the axis of symmetry 10 of the ring gear 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for joining components, comprising welding a first component comprising case-hardened steel to a second component comprising cast iron via a nickel-containing filler, wherein the first and second components are welded together without undergoing at least partial abrasion of surfaces to be joined.

2. A process according to claim 1, wherein the filler is in the form of a foil.

3. A process according to claim 2, further comprising placing the filler between the first component and the second component prior to the welding, so that it is available over the entire area of the joint which is to be welded.

4. A process according to claim 2, wherein a thickness of the foil is from 0.1 to 0.3 mm.

5. A process according to claim 1, wherein the filler is X10CrNiTi18 9.

6. A process according to claim 1, wherein the filler is pure nickel.

* * * * *